United States Patent Office 3,510,191
Patented May 5, 1970

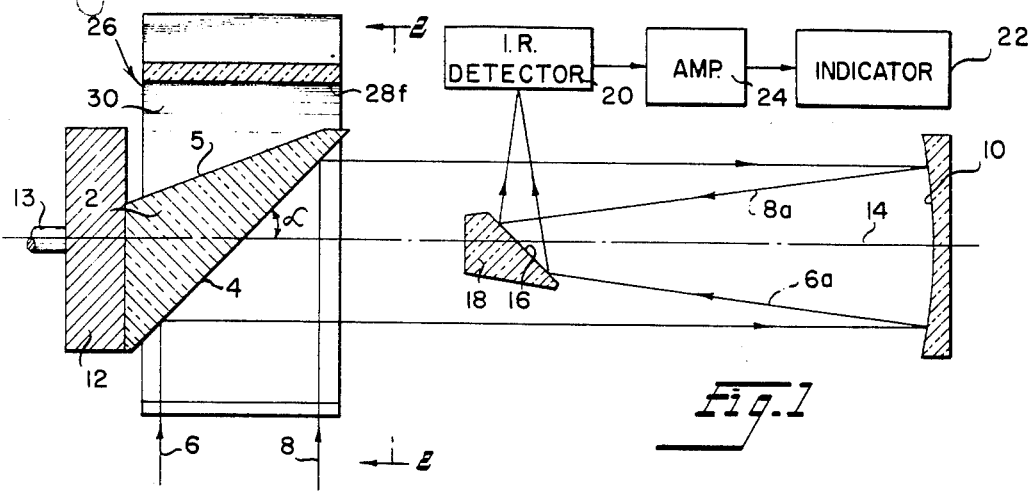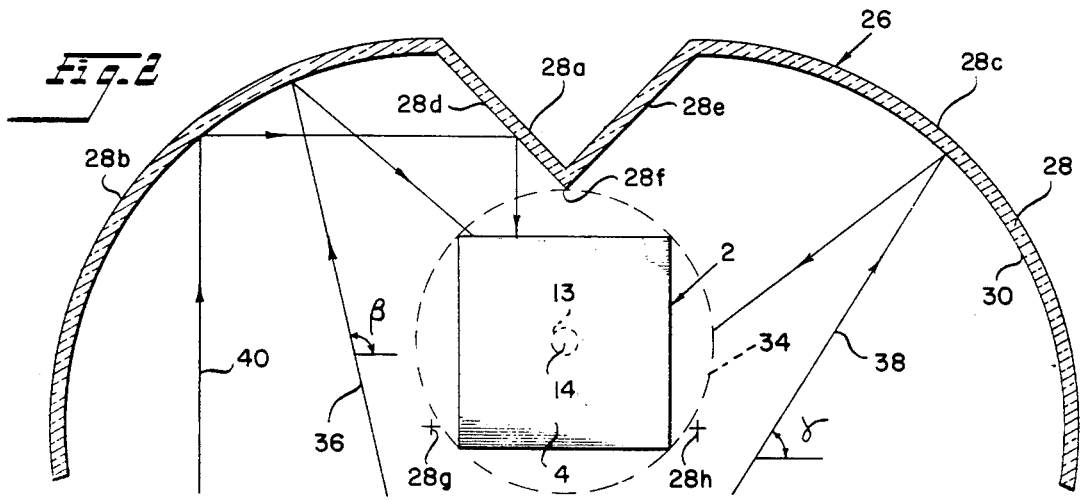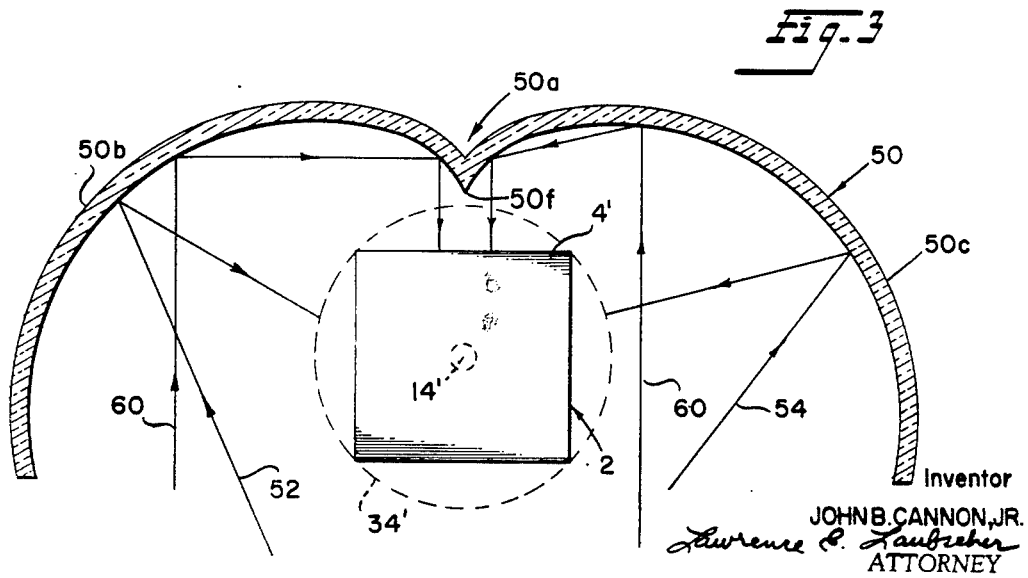

3,510,191
OPTICAL SCANNING SYSTEM
John B. Cannon, Jr., State College, Pa., assignor to HRB-Singer, Inc., State College, Pa., a corporation of Delaware
Filed May 3, 1967, Ser. No. 637,868
Int. Cl. G02b 17/00; G02f 1/34
U.S. Cl. 350—7                              6 Claims

ABSTRACT OF THE DISCLOSURE

An improved optical scanning system including novel reflector means for continuously reflecting incident ray energy within the rotational path of a scanning mirror. The reflector has a generally semicylindrical configuration the longitudinal axis of which is coincident with the axis of rotation of the scanning mirror, said reflector including a longitudinally extending knifelike central portion that converges in the direction of said longitudinal axis.

---

This invention relates generally to an improved optical scanning system, and more particularly to novel reflector means for continuously reflecting incident ray energy upon a rotary scanning mirror.

It is well known in the patented prior art—as evidenced, for example, by the patents to Menke No. 3,004,162, Wormser No. 3,173,019 and Astheimer et al. No. 3,119,018—to utilize rotary scanning mirror means in systems for detecting incident ray energy (such as light or infrared energy).

In certain applications—such as the searching for thermal variations on the sea surface—the dimensions of the optical and/or detecting elements are chosen so that the thermal sensitivity of the system will be extremely high, usually at the expense of poor spatial resolution. Under these conditions the signal excursions between the desired scene and the "dead" time when the scanner is looking into its structural housing may become so large as to present difficulties in the design of suitable amplifier circuits to handle these signals. While this problem could, of course, be handled electronically, a preferred solution, in accordance with the present invention, is to utilize novel optical reflector means for illuminating the detector with approximately the same amount of infrared energy during the scanner "dead" time as it receives during the active scanning period of its rotation, in order to reduce the range requirements of associated amplifier circuitry.

Accordingly, the primary object of the present invention is to provide improved concave reflector means for continuously reflecting incident ray energy upon a scanning mirror rotatably mounted coaxially therein. The concave reflector means has a generally semicylindrical configuration and includes a longitudinally extending knifelike central portion that converges radially inwardly toward the longitudinal axis of the reflector (and, consequently, the rotational axis of the scanning mirror). On opposite sides of this convergent knifelike central portion, concave side wall portions are defined, whereby when the scanning mirror is in the "dead" time position facing rearwardly in the reflective housing, ray energy is reflected upon the scanning mirror by the double reflective path including one sidewall portion and one wall of the convergent central portion.

A further object of the invention is to provide an optical scanning system including concave reflector means of the type described above, said system including an objective mirror and a scanning mirror rotatable about the optical axis of said objective mirror, said concave reflector means being mounted concentrically partially about said scanning mirror. Incident ray energy reflected upon the scanning mirror is reflected to the objective mirror, which, in the preferred embodiment, is parabolic and reflects the ray energy upon an infrared detector via a folding mirror. The detected signal is amplified and is transmitted to conventional signal measuring or indicating means. Since substantially the same ray energy is detected by the detector, the dynamic range requirements of the amplifier means are advantageously reduced.

A more specific object of the invention is to provide a concave reflector having in transverse cross section a semicylindrical configuration that is divided into two side wall portions by a longitudinally extending convergent knifelike central portion. In accordance with one embodiment of the invention, the central extension is V-shaped and the side portions are arcuate and include centers on opposite sides of the vertical plane passing through the apex of the central extension. In another embodiment, the central extension is a cusp the walls of which merge smoothly wtih the walls of the side wall portions.

Other objects and advantages of the invention will become apparent from a study of the following specification when considered in conjunction with the accompanying drawing, in which:

FIG. 1 is a diagrammatic representation of the optical radiant energy detection system of the present invention;

FIG. 2 is a sectional view taken along line 2—2 of FIG. 1; and

FIG. 3 illustrates an alternative reflector construction.

Referring now to FIG. 1, the optical system includes a scanning mirror 2 having a planar reflecting surface 4 for reflecting incident radiant energy rays 6, 8 upon a parabolic objective mirror 10. The scanning mirror 2 is carried by a rotary support 12 having a rotatable shaft 13 that rotates about the optical axis 14 of the objective mirror 10, the planar mirror surface 4 being arranged at the angle "α" to this axis as shown. The rays 6a, 8a that are reflected by the objective mirror 10 are directed toward the planar reflective surface 16 of a folding mirror 18, which mirror reflects the rays laterally outwardly upon a detector 20 the output of which is connected with an indicator 22 via the amplifier 24.

In accordance with the present invention, stationary concave reflective housing means 26 are mounted about the rotary scanning mirror 2 for reflecting the incident radiant energy upon the mirror reflective surface 4. Referring to FIG. 2, the reflective housing means 26 includes a generally semicylindrical body member 28 defining a generally semicylindrical recess having a reflective inner surface 30, said body member including a longitudinally extending central knifelike portion 28a that defines a pair of concave generally semicylindrical side portions 28b and 28c. As shown in FIG. 2, the central portion 28a has in transverse cross section a V-shaped configuration the converging walls 28d, 28e of which terminate at linear edge 28f that extends parallel with and spaced from the axis 14.

The reflector side portions 28b, 28c have arc centers 28g, 28h, respectively, on opposite sides of the vertical plane containing edge 28f and axis 14. The reflective inner surfaces of these side portions are operable to reflect within the path 34 of the rotary scanning mirror 4 incident rays 36, 38 having obtuse and acute angles (β and γ), respectively.

In accordance with the present invention, the reflective wall surfaces 28d, 28e of the central housing portion 28a are operable as part of a double reflective path for directing ray energy upon the reflective surface 4 when the scanning mirror reaches a "dead" time position rotated 180° from the FIG. 1 position (i.e., when the rear mirror surface 5 is directed toward the incident ray energy and the front mirror surface 4 faces the central portion 28a of the housing). As shown in FIG. 2, the incident ray 40 is reflected both by the side wall portion 28b and by the central portion wall surface 28d for direction upon the scanning mirror 2. Consequently, regardless of the angular position of the scanning mirror, substantially the same amount of radiant energy is detected by the infrared detector 20, whereby the dynamic range requirements of the amplifier 24 may be reduced.

Referring to the alternative embodiment illustrated in FIG. 3, the semicylindrical reflector body 50 includes a longitudinally extending knifelike central portion 50a that defines on opposite sides of the edges 50f of a pair of generally semicylindrical side portions 50b, 50c. In this embodiment, the central portion has a cusp configuration the reflective wall surfaces of which merge smoothly with the walls of the side portions, whereby certain incident rays (52, 54) are reflected directly to the path 34' of the rotary scanning motor 4', and other rays (60) are reflected toward the rotary scanning mirror path by double reflection via one of the side wall portions and the central cusp portion. Consequently, even when the reflective surface 4' of the scanning mirror 2' faces the cusp portion 50a of the reflective housing 50, incident rays will be reflected upon the scanning mirror for transmission to the objective mirror.

While in accordance with the provision of the patent statutes the preferred form and embodiments of the invention have been illustrated and described, it will be apparent to those skilled in the art that changes may be made in the apparatus described without deviating from the invention set forth in the following claims.

What is claimed is:

1. Concave reflector means adapted for arrangement about rotary scanning mirror means that periodically reflect to stationary objective lens means incident ray energy that is initially directed normal to the axis of rotation of said scanning mirror means, said concave reflector means being operable to reflect ray energy to said objective lens means during the dead time when the scanning mirror means is directed away from the incident ray energy, comprising a reflector body containing in one surface a generally semicylindrical recess the central longitudinal axis of which is parallel with said surface, the wall of said recess including a pair of reflective generally semicylindrical concave portions arranged on opposite sides of a central knifelike portion having a V-shaped transverse cross section the walls of which are planar, said knifelike portion projecting radially inwardly toward the axis of said recess and converges to define a linear edge spaced from said axis, said generally semicylindrical concave portions, said central knifelike portion and said linear edge each extending longitudinally the length of said recess.

2. An optical scanning system, comprising
an objective mirror;
rotary support means rotatable about an axis parallel with the optical axis of said objective mirror;
means including a scanning mirror carried by said support for periodically directing on said objective mirror incident ray energy the initial direction of which is contained in a plane normal to said optical axis, said scanning mirror having an angularly arraged planar mirror surface; and stationary concave reflector means having a concave reflective surface partially enclosing and arranged coaxially about the axis of rotation of said scanning mirror means for reflecting the incident ray energy thereon when said planar mirror surface is in the dead position facing said reflective surface, said reflector means comprising a reflector body containing in one surface a generally semicylindrical recess the central longitudinal axis of which is parallel with said surface, the wall of said recess including a pair of reflective generally semicylindrical concave portions arranged on opposite sides of a central knifelike portion that projects radially inwardly toward the axis of said recess and converges to define a linear edge spaced from said recess axis, said generally semicylindrical concave portions, said central knifelike portion and said linear edge each extending longitudinally the length of said recess.

3. An optical system as defined in claim 2, wherein said objective mirror is parabolic, and further including stationary folding mirror means arranged on the optical axis of said objective mirror for reflecting the ray energy received thereby laterally from said optical axis.

4. Apparatus as defined in claim 2, wherein said central knifelike portion has in transverse cross section a V-shaped configuration.

5. An optical system as defined in claim 2, wherein said objective mirror is parabolic, and further including stationary folding mirror means arranged on the optical axis of said objective mirror for reflecting the ray energy received thereby laterally from said optical axis.

6. Apparatus as defined in claim 4, wherein the concave generally semicylindrical recess side portions of said body member define in transverse cross section the arcs of circles the radii of which are arranged on opposite sides of the plane that contains the longitudinal axis of said recess and the linear edge of said central knifelike portion.

References Cited

UNITED STATES PATENTS

| | | | |
|---|---|---|---|
| 2,333,583 | 11/1943 | Rogers | 350—296 |
| 3,004,162 | 10/1961 | Menke. | |
| 3,156,823 | 11/1964 | Astheimer et al. | 350—7 |
| 3,119,018 | 1/1964 | Astheimer et al. | |
| 3,211,046 | 10/1965 | Kennedy | 350—7 |
| 3,023,662 | 3/1962 | Hicks | 350—7 |
| 3,217,170 | 11/1965 | Bin-Lun Ho | 350—285 X |

PAUL R. GILLIAM, Primary Examiner

U.S. Cl. X.R.

350—285, 296; 178—7.6; 240—103, 41.35